(12) United States Patent
Colby

(10) Patent No.: US 6,981,357 B2
(45) Date of Patent: Jan. 3, 2006

(54) METHOD FOR HARVESTING

(76) Inventor: Edward K. Colby, P.O. Box 247, Oakview, CA (US) 93022

( * ) Notice: Subject to any disclaimer, the term of this patent is extended or adjusted under 35 U.S.C. 154(b) by 0 days.

(21) Appl. No.: 10/710,313

(22) Filed: Jul. 1, 2004

(65) Prior Publication Data
US 2004/0231963 A1 Nov. 25, 2004

Related U.S. Application Data

(62) Division of application No. 10/159,878, filed on May 29, 2002, now Pat. No. 6,758,317.

(60) Provisional application No. 60/303,560, filed on Jul. 6, 2001.

(51) Int. Cl.
*A01B 73/00* (2006.01)

(52) U.S. Cl. ...................................................... 56/228
(58) Field of Classification Search ............... 56/327.1, 56/327.2, 228; 198/312, 313, 318; 53/448, 53/391; 414/503, 508, 523
See application file for complete search history.

(56) References Cited

U.S. PATENT DOCUMENTS

| 688,912 | A | | 12/1901 | Watts | |
|---|---|---|---|---|---|
| 1,504,846 | A | * | 8/1924 | Tarkington | 414/508 |
| 2,590,965 | A | * | 4/1952 | Huston | 53/391 |
| 2,699,877 | A | | 1/1955 | Huston | 214/83.26 |
| 3,599,784 | A | | 8/1971 | Rossi | 198/233 |
| 3,724,168 | A | | 4/1973 | Cassady, Jr. | 53/3 |
| 3,827,446 | A | | 8/1974 | Honeycutt | 134/63 |
| 4,292,784 | A | | 10/1981 | Abatti | 53/391 |
| 4,411,581 | A | | 10/1983 | Niewold | 414/489 |
| 4,557,368 | A | * | 12/1985 | Alameda | 198/313 |
| 4,590,739 | A | | 5/1986 | Abatti | 53/391 |
| 4,616,468 | A | | 10/1986 | Munoz | 53/391 |
| 4,655,667 | A | | 4/1987 | Plumb | 414/343 |
| 4,736,574 | A | | 4/1988 | Walker | 56/328.1 |
| 4,876,844 | A | * | 10/1989 | Grey | 53/458 |
| 4,899,527 | A | | 2/1990 | van den Munckhof | 56/328.1 |
| 5,218,812 | A | * | 6/1993 | Ventura et al. | 53/391 |
| 5,549,414 | A | | 8/1996 | Boxall | 404/101 |
| 6,029,431 | A | | 2/2000 | Dowler | 56/14.3 |
| 6,070,402 | A | | 6/2000 | Korthuis | 56/330 |
| 6,186,311 | B1 | | 2/2001 | Conner | 198/300 |

* cited by examiner

*Primary Examiner*—Árpád Fábián Kovács
(74) *Attorney, Agent, or Firm*—Ralph D. Chabot

(57) ABSTRACT

A method for harvesting plants bearing fruit or vegetables and particularly strawberries is disclosed. The method incorporates the use of a vehicle that comprises a conveyor belt system which is a pair of conveyors each comprising a belt assembly and an elongated trough positioned in a fixed relation above the belt assembly. Each conveyor is configured so that it can span many rows of fruit. Workers stand behind a conveyor and follow the vehicle picking strawberries. When the vehicle reaches the end of a row, the conveyor belt system is arc displaced over the vehicle to the opposite side using hydraulic power or some other appropriate means for displacement. The vehicle wheels are orientated for travel along the access road along the end of a field, for example, 90 degrees when the road is perpendicular to the rows of fruit. The vehicle then travels along the end of the field until it is again aligned with rows of fruit to be picked. The wheels are then orientated back for travel across the field.

5 Claims, 12 Drawing Sheets

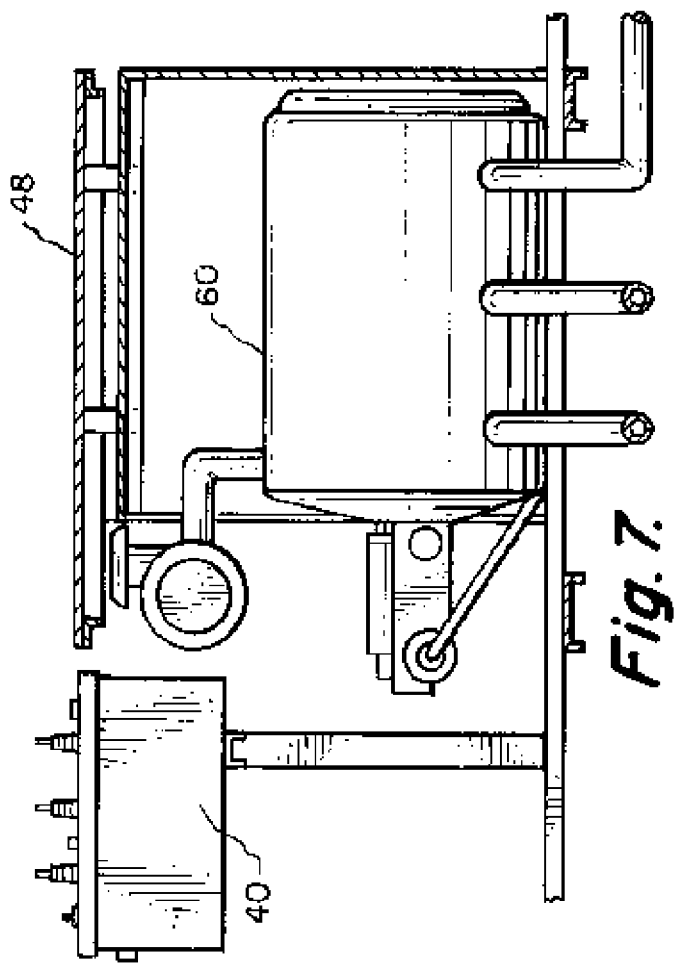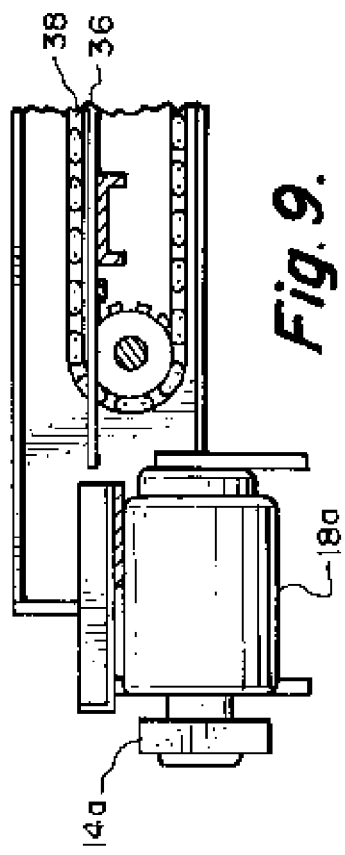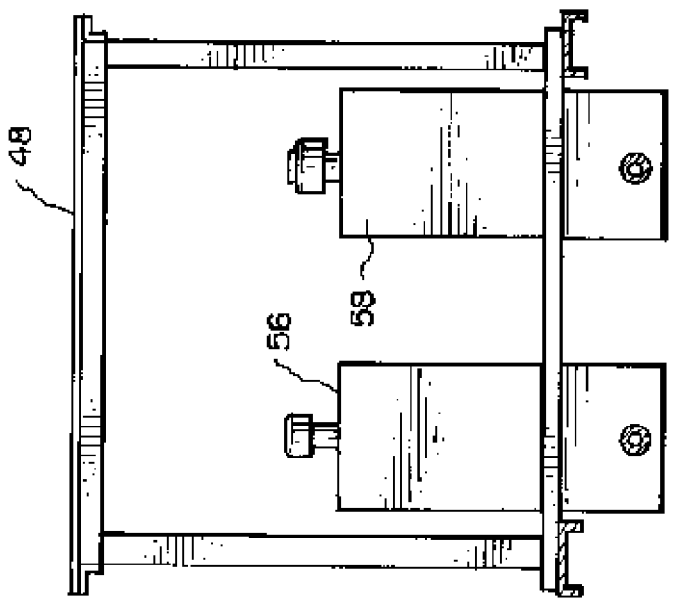

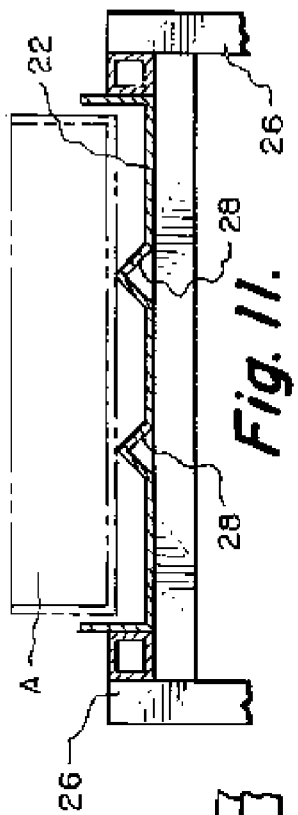
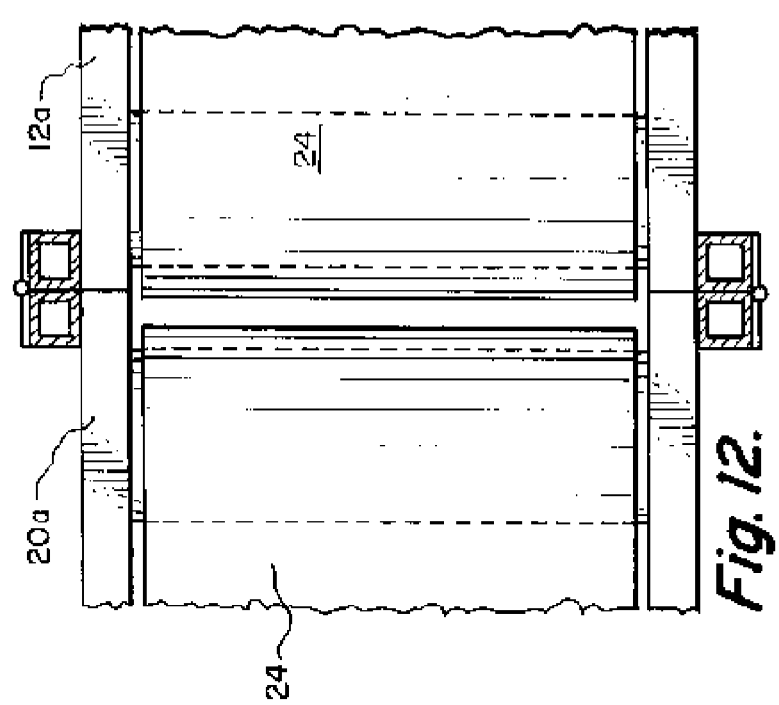
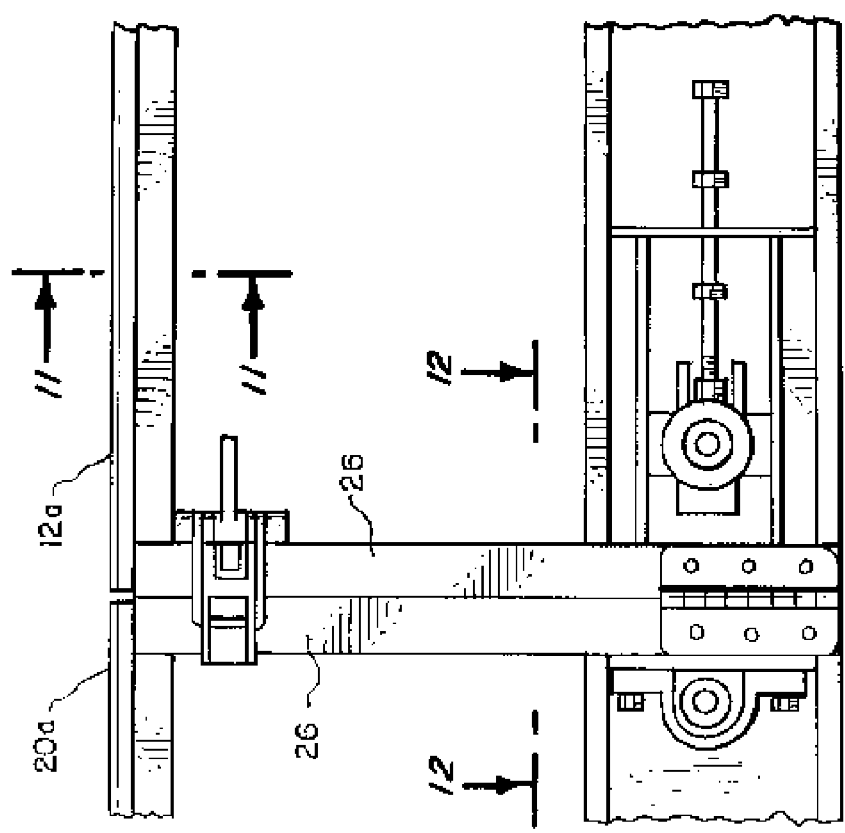

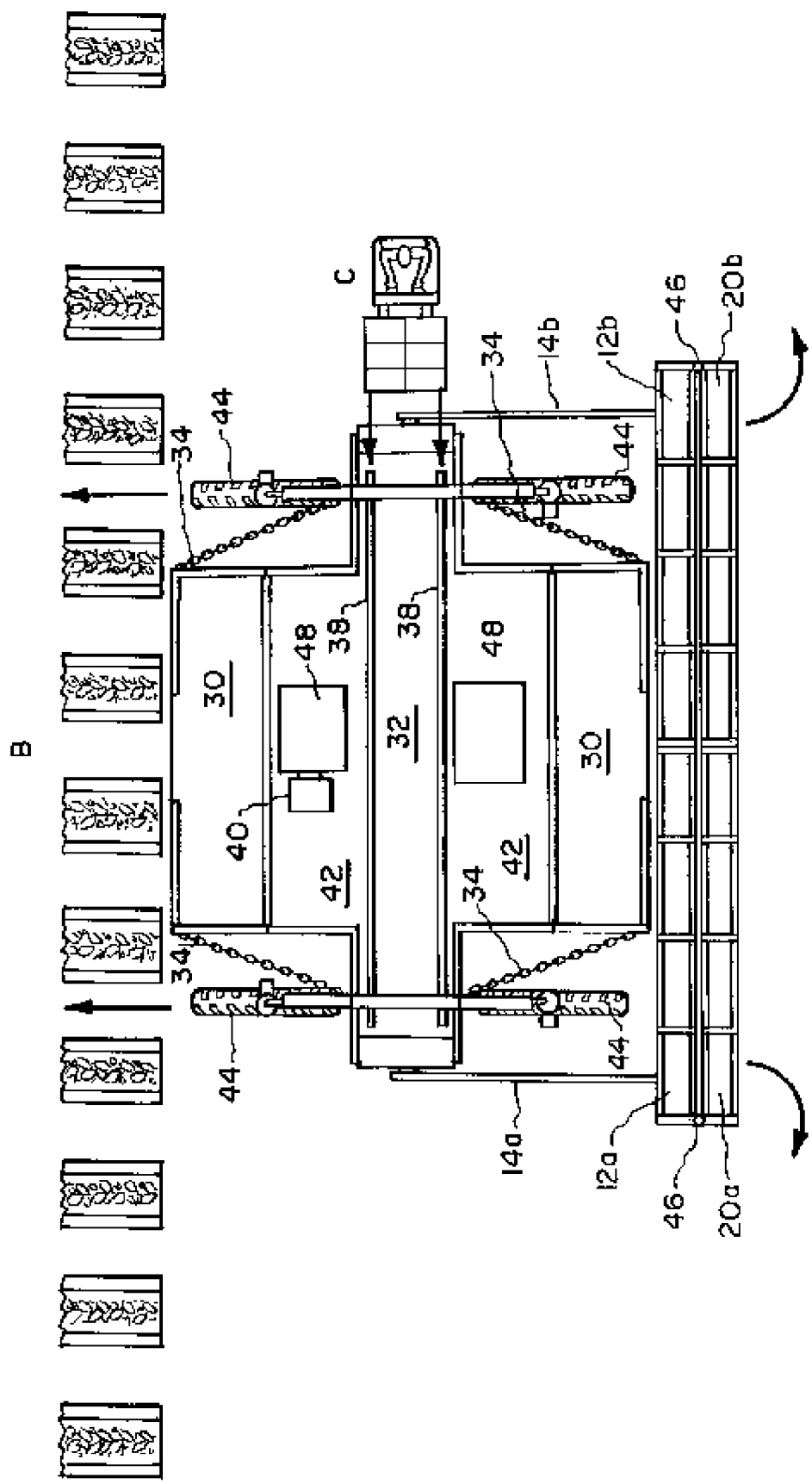

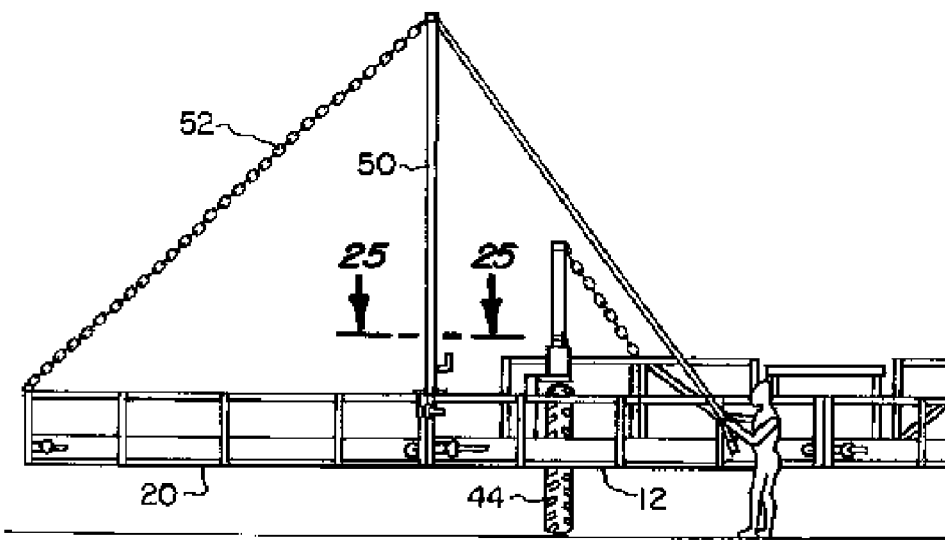
Fig. 24.
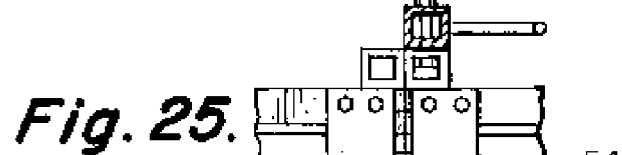
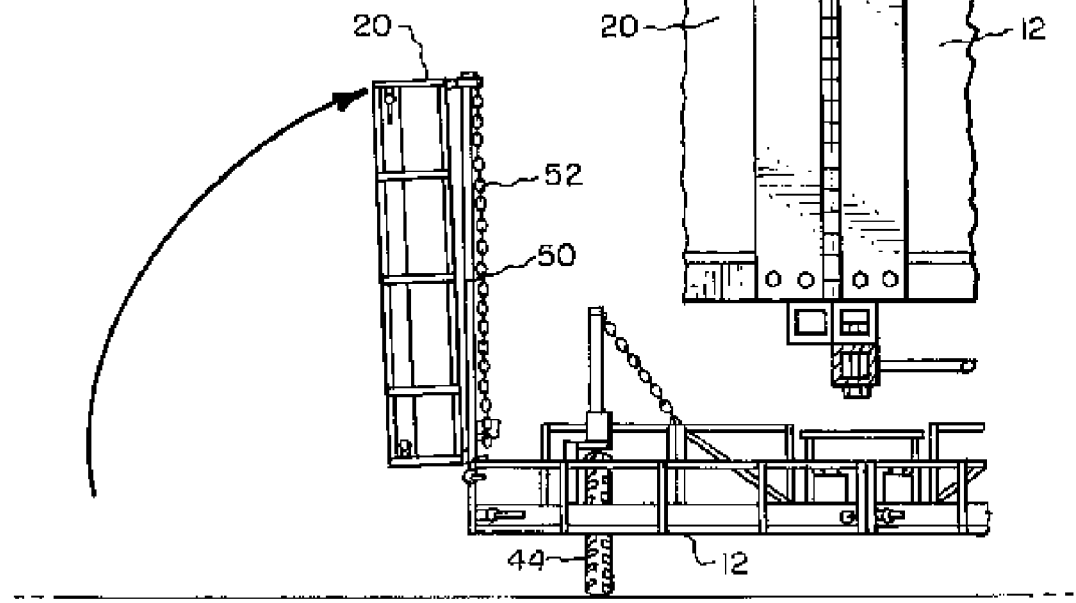
Fig. 17.

METHOD FOR HARVESTING

CROSS-REFERENCE TO RELATED APPLICATIONS

Applicant claims the benefit of utility application bearing U.S. Ser. No. 10/159,878 filed May 29, 2002, now U.S. Pat. No. 6,758,317 issued Jul. 6, 2004, and, provisional application bearing U.S. Ser. No. 60/303,560 filed Jul. 6, 2001.

TECHNICAL FIELD

This invention pertains to the field of agricultural harvesting practices. The specification submitted in U.S. Ser. No. 10/159,878 is herein incorporated by reference.

BACKGROUND OF THE INVENTION

Vehicles for many years have been adapted and modified to assist in the harvesting of agricultural products. Even with the assistance of vehicles, harvesting of certain crops, particularly small and delicate fruit such as strawberries, are extremely labor intensive.

Strawberry harvesting requires the backbreaking work of many laborers. Boxes, referred to as flats, are used for collection of the fruit. For a typical strawberry field, workers will carry the empty flats and harvest the strawberries by hand, placing the gathered fruit into these flats. When filled, each flat is typically carried to the edge of the field where they are palletized with other flats. The carrying of filled flats is extremely inefficient; particularly when the flat is filled near the middle of a field. A worker must carry the flat, sometimes in muddy conditions, to the end of the field and then return to continue picking fruit. Studies have shown that lost time attributed to carrying loaded flats to the end of a field for palletizing can reach 30%.

Once palletized, the strawberry flats are then transported to a facility for refrigeration. Prior to wholesale distribution, it is a typical industry practice to cool the freshly picked fruit to about a temperature of 35 degrees F. To obtain this fruit temperature, strawberries harvested at 70 degrees F. will require approximately 3 hours to cool while strawberries harvested at 50 degrees F. require only 20 minutes.

The harvest season for strawberries can last approximately 6 months. It is typical industry practice to reinspect the strawberry plants every three days and harvest the ripened fruit.

As stated earlier, various vehicular designs have been used in the prior art to assist laborers for harvesting fruit. One of these prior art designs was disclosed in U.S. Pat. No. 4,292,784 issued to Abatti et. al. Abatti et. al. teaches a vehicle which utilizes a pair of conveyors which can span many rows of plants. The vehicle was designed for harvesting large produce such as watermelons.

One problem associated with vehicles utilizing elongated conveyors is that the turning radius of the vehicle is the wingspan of at least one of the conveyors. When the vehicle reaches the end of a row, the field must have sufficient clearance to permit the vehicle to be turned 180 degrees and aligned with rows next to be harvested. The increased turning radius of the vehicle can be a problem; especially if used in fields having space limitations. If insufficient space is available, the vehicle can not be turned without first removing or disconnecting at least one of the conveyors. Although it is possible to implement, this would be an extremely inefficient use of time.

SUMMARY OF THE INVENTION

My invention is a method for harvesting fruit such as strawberries which comprises a self-powered vehicle wherein all vital functions are preferably hydraulically operated. The vehicle configuration has been described in the "SUMMARY OF THE INVENTION" Section of application Ser. No. 10/159,878 and is hereby incorporated by reference.

Harvesting Operation.

The harvest vehicle is positioned so that the conveyor belt system (i.e. two conveyors and their respective associated wing conveyors) substantially span rows of strawberries to be picked. As the vehicle travels slowly from one end of the field to the other, workers standing behind the vehicle and conveyors, pick the ripened fruit as they follow.

When a flat is filled with fruit, rather than carrying the flat to the edge of the field, the worker simply places the flat onto an adjacent conveyor belt, which transports the flat to a position adjacent a work area upon the vehicle. The worker next retrieves an empty flat from the trough, which is located above the conveyor belt and within easy reach of the worker.

Workers on the platform remove the filled flats from the conveyor. They are also responsible for ensuring that each trough is filled with empty flats. They accomplish this by periodically adding empty flats to the trough adjacent to the work area and pushing the flats until they are aligned side by side.

Workers on the platform also inspect the flats to insure that the quantity and appearance of the fruit is acceptable. A table is provided on each platform to facilitate this procedure. The flats are then positioned on pallets located on a central conveyor, referred to here as the pallet conveyor.

The pallet conveyor spans the width of the vehicle in parallel relation to conveyor belt system. The pallet conveyor can itself be another belt conveyor similar to that used for the conveyor belt system. However, more preferable, is the use of a pair of parallel looped chains spaced apart from one another and where the chain height is above the floor height. Therefore, pallets rest upon the pair of parallel chains.

The pallet conveyor is used to move pallets having filled flats of strawberries into position for removal from the vehicle. The pallet conveyor can be operated in either direction so that pallets can be loaded or removed from either side of the vehicle. Initially, pallets are loaded by forklift or the like onto the pallet conveyor. Empty flats can also be loaded onto the vehicle in similar fashion. To unload pallets of fruit from the vehicle, the pallet conveyor would be displaced until the filled pallet is near the edge of the vehicle so it can be easily removed by a forklift or direct transfer to a flatbed truck positioned adjacent. An alternative embodiment can incorporate the use of an electronic eye positioned across the surface of the conveyor near the vehicle's edge and which would terminate the conveyor's operation every time a pallet or other object is recognized.

The vehicle also comprises a second work area located on the opposite side of the pallet conveyor. This second work area is essentially a duplicate of the first work area and is used when the vehicle travels in the opposite or reverse direction.

Vehicle Adjustments.

When the vehicle is at the end of a row, its tires can be rotated 90 degrees or to any other desired horizontal orientation, and the vehicle can travel along the edge of the field a distance with the new tire orientation until it is aligned with other rows of fruit to be inspected. The wheels are then rotated back to their original orientation and the wing conveyors are arc displaced to the opposite side.

In this way, the turning radius of the vehicle becomes irrelevant since the vehicle's orientation relative to the field does not change. What changes is the tire orientation for aligning the vehicle with different rows of fruit and the displacement of the wing conveyors by the rotating arms from one side to the other.

The vehicle is preferably designed so that the tire spacing can be adjusted. Tire adjustment permits the vehicle to adapt for operation in various fields having different row spacing.

When the vehicle reaches the end of the row, the tires will be rotated as necessary so that the vehicle can travel along the edge of the field. The vehicle will typically travel a sufficient distance so that unpicked rows of fruit are within the wingspan of the conveyor sections. The conveyor belt system is arc displaced over the vehicle by the pair of rotating arms so that the conveyor belt system is now behind the vehicle for its travel back across the field. The workers on the vehicle, previously working on one platform, now move across the pallet conveyor and onto the other platform. The vehicle then proceeds in the reverse direction and the picking procedure is the same as described earlier.

Alternative Designs.

An alternative embodiment of this vehicle can include a second conveyor belt system located on the side opposite the first. Instead of displacing the conveyor belt system from one side to the other as described above, no displacement is necessary. The drawbacks for incorporating a second conveyor belt system are the additional cost and weight.

Still another embodiment would eliminate the top trough section from the conveyor belt system. For this embodiment, the leveling means previously described would not be necessary.

Night-Time Operation.

Because of the wingspan of the conveyor belt system, workers can gather fruit behind the vehicle over an area spanning many rows. This aspect can be advantageous and permits the possibility of conducting harvesting operations at night. By operatively mounting a series of floodlights on the vehicle, the workers, who are harvesting in close proximity to the vehicle, can pick the ripened fruit at night and in cooler conditions. Preferably, the ideal position for a series of floodlights would be on a boom anchored to the vehicle so that the boom could extend over and beyond the conveyor system so illumination of the fruit can occur without the conveyor system casting a shadow upon the area of fruit to be harvested.

A number of advantages are realized by operating at night. Because the ambient temperature is cooler, workers are less prone to heat exhaustion. Additionally, the harvested fruit will have a lower temperature than the fruit picked during daylight hours. This is important when taking refrigeration costs into account. Nighttime picked fruit will require less refrigeration time to cool to the desired shipping temperature as mentioned earlier. Fruit can therefore be shipped faster. Nighttime harvesting also permits 24 hours a day harvesting, allowing the vehicle to cover more acreage than if it only operated during daylight.

BRIEF DESCRIPTION OF THE DRAWINGS

FIG. 7 is a view taken along line 7—7 of FIG. 4.

FIG. 8 is a view taken along line 8—8 of FIG. 4.

FIG. 9 is a view taken along line 9—9 of FIG. 4.

FIG. 10 illustrates a first alternative embodiment for extension of the wing conveyors utilizing a hinging means.

FIG. 11 is a view of FIG. 10 taken along line 11—11 and illustrates the position of a flat upon a tray chute.

FIG. 12 is a view of FIG. 10 taken along line 12—12 and illustrates the operational relationship of the wing conveyor belt to the corresponding adjacent vehicle conveyor belt.

FIG. 16 is an overhead view of the unit positioned at the edge of a field and illustrating the direction for extending the wing conveyors and the stacking of empty pallets with a forklift.

FIG. 17 illustrates the folding of the wing conveyor of the second alternative embodiment illustrated in FIG. 24.

FIG. 24 illustrates a second alternative embodiment for extending a wing conveyor.

FIG. 25 is a view of FIG. 24 taken along line 25—25.

DETAILED DESCRIPTION OF THE PREFERRED EMBODIMENT

Figure 1:
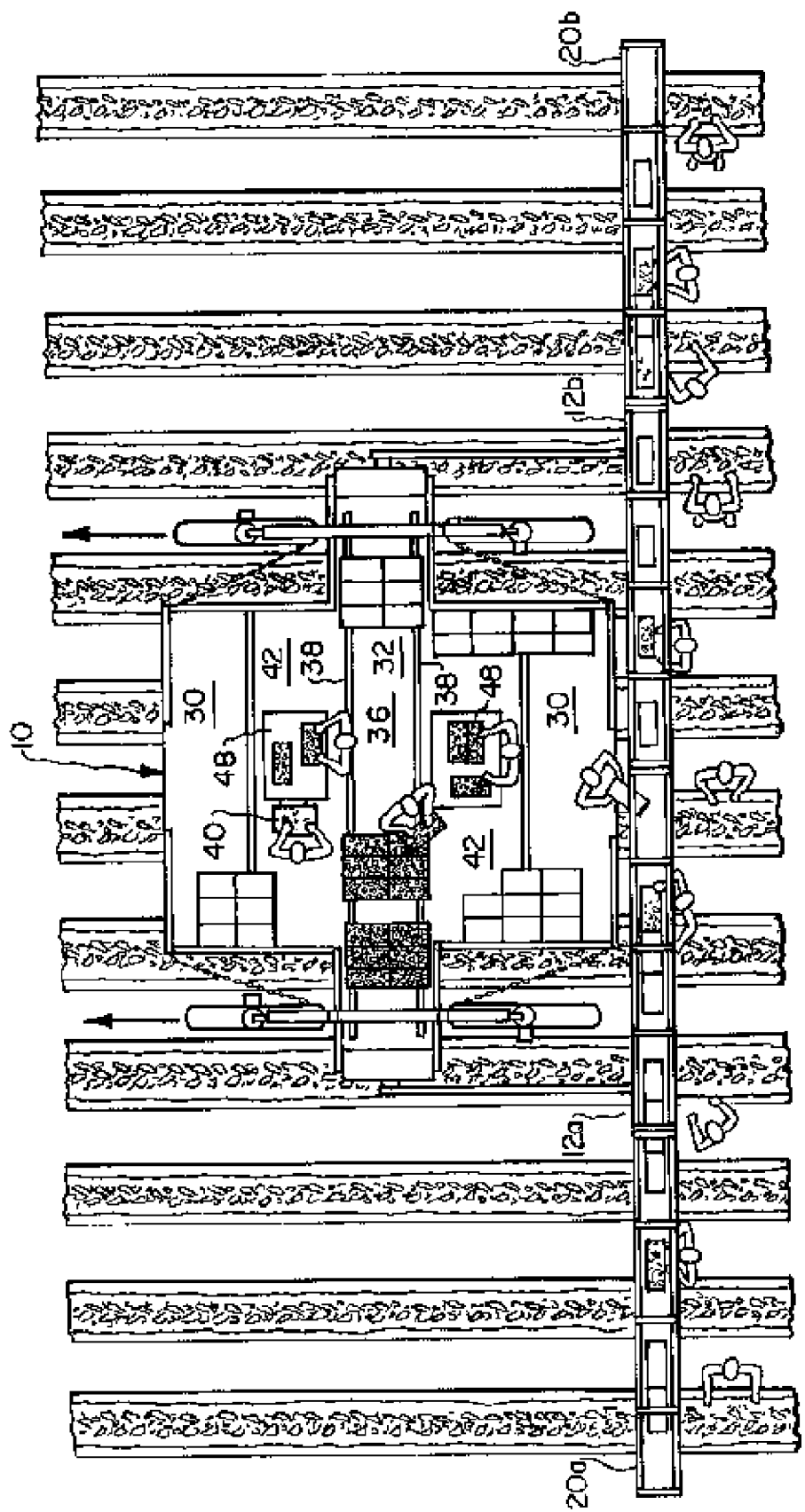
FIG. 1 is an overhead view illustrating the unit traveling through a field with workers harvesting fruit.

FIG. 1 illustrates the operation of harvester unit 10 in a field. A number of laborers can work upon the main body of unit 10. The main body is defined to include the foldable work platform areas 30, stationary work areas 42, and central area 36. Located on one of stationary areas 42 is control panel 40 from which an operator can control all vehicular functions.

Figure 4:
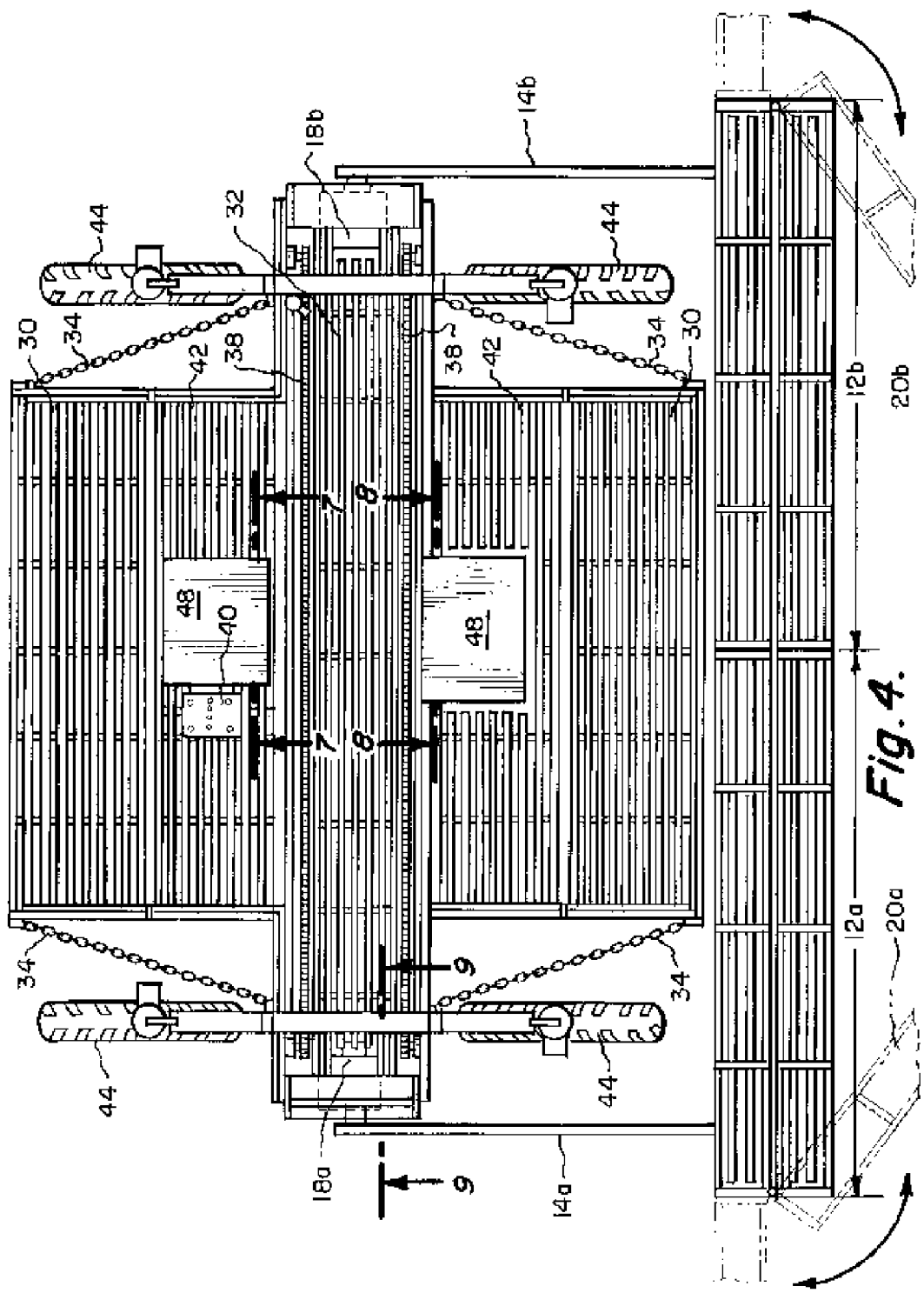
FIG. 4 is a top view of my unit illustrating one means for extending the wing conveyors to respective conveyors.

FIGS. 4, 7, and 8 illustrate the positioning beneath tables 48 of hydraulic oil tank 56, fuel tank 58 and engine 60.

Figure 2:
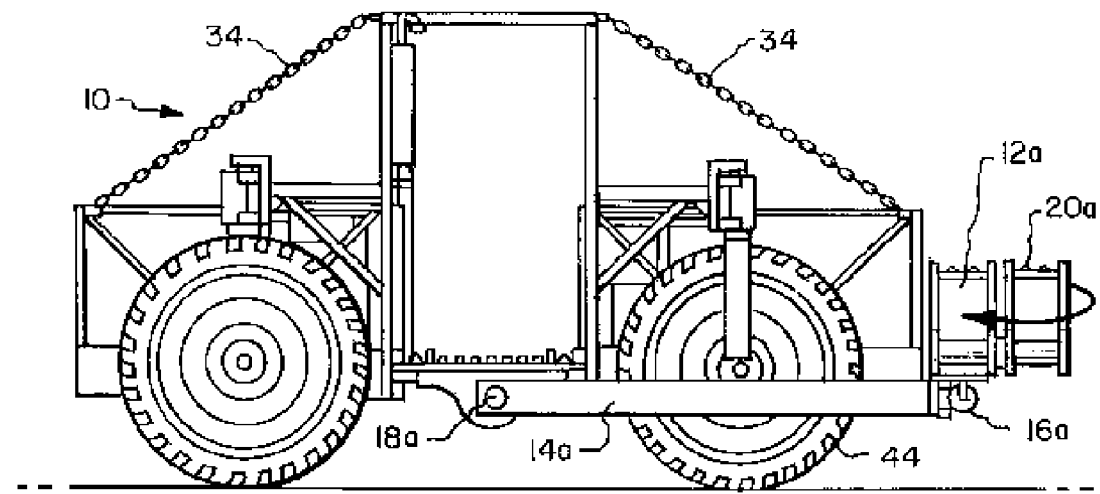
FIG. 2 is a first side view.

FIG. 2 is a side view of harvester unit 10 illustrating its appearance between transport and harvesting configurations incorporating hinge connection embodiment of the wing conveyor 20a to conveyor 12a. Harvester unit 10 carries its own power supply and drive mechanism so that it can travel between locations on its own. Before describing the transport and harvesting configurations in detail, the following paragraphs will describe the connectivity of the parts to one another.

Figure 3:
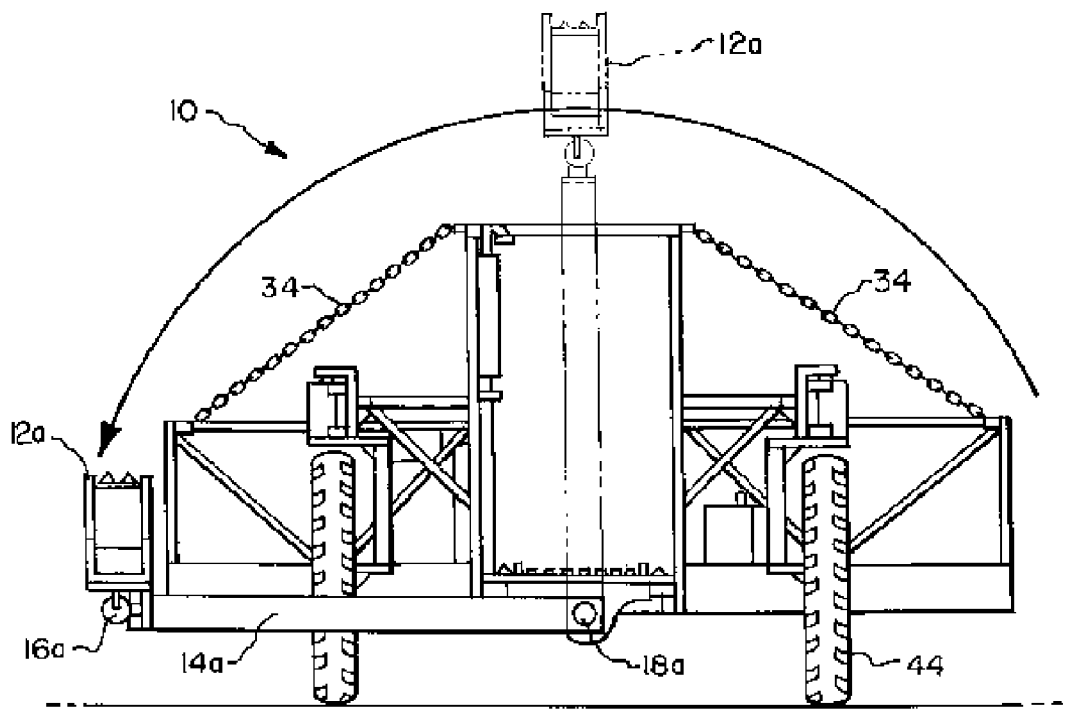
FIG. 3 is a second side view of my invention illustrating the conveyor belt changing position from one side of the vehicle to the opposite side and also showing the wheels orientated 90 degrees from FIG. 1.
Figure 5:
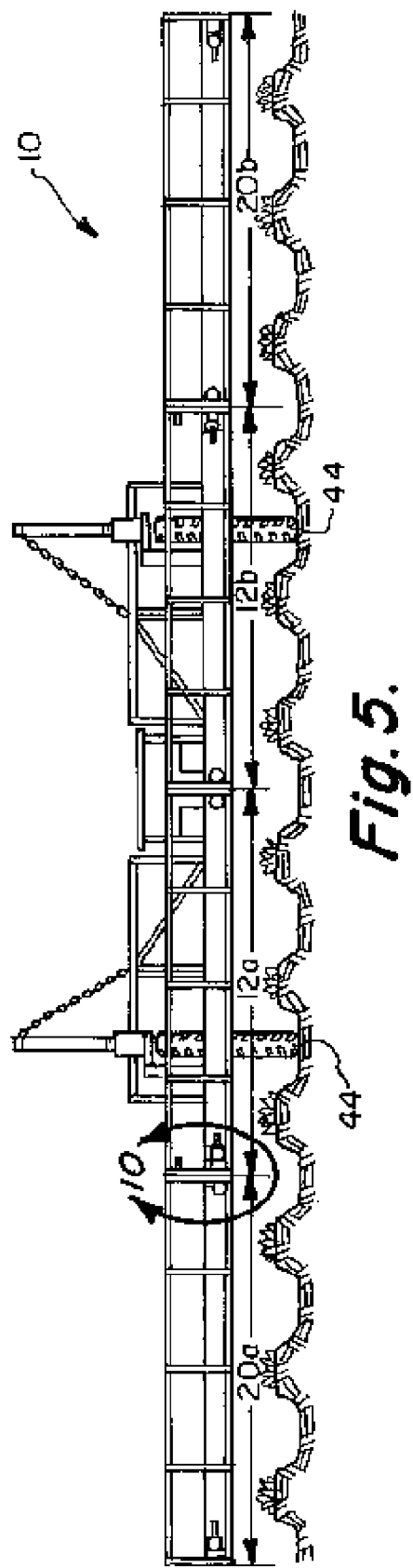
FIG. 5 is a rear view with the wing conveyors in extended position.
Figure 6:
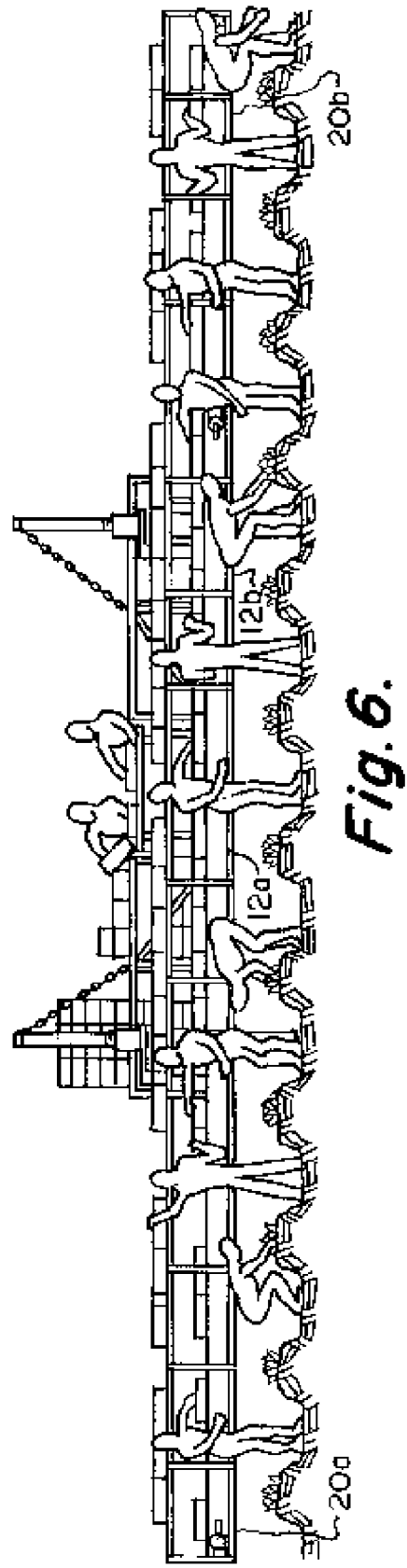
FIG. 6 is FIG. 5 depicted in operation.

FIGS. 5 and 6 display a rear view of the harvester unit 10 having conveyors 12a and 12b. Conveyors 12a and 12b are connected to respective rotating arms 14a and 14b as seen in FIG. 4. Referring to FIG. 3, operatively connected to a respective set of conveyors and rotating arms is a hydraulic leveling device with level sensor 16a and 16b. Each rotating arm is operatively connected to the vehicle body by connection to a hydraulic rotating device 18a and 18b respectively. Also connected to conveyors 12a and 12b are wing conveyors 20a and 20b respectively.

Each of the conveyors 12 and wing conveyors 20, comprise the following sections which are illustrated in FIGS. 10, 11, and 12. Each conveyor has an upper elongated trough section 22 and a lower rotating belt section 24 connected to one another by vertical supports 26. Power couplings (not shown) provide the power for belt section 24 on wing conveyors 20a and 20b.

Referring to FIG. 11, trough section 22 preferably includes a pair of longitudinally extending chevrons 28 which are used to minimize the contact surface area with an empty flat "A" placed into the trough. This design reduces friction; allowing multiple empty flats to be displaced along trough 22 with minimal force.

Figure 14:
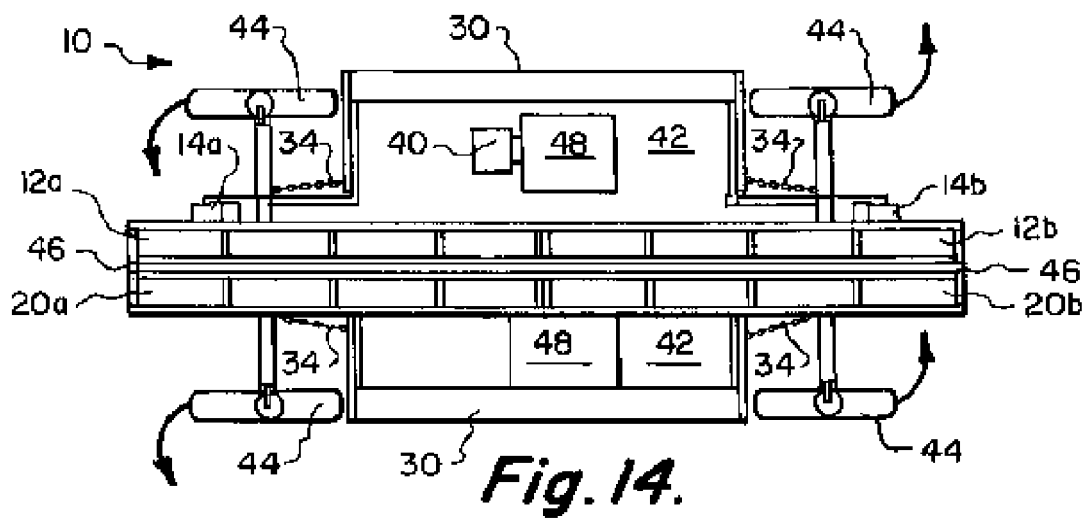
FIG. 14 is a top view of the unit with the work platforms folded and indicating the direction to orient the wheels prior to harvesting operations.

FIGS. 4 and 14, illustrate a work platform section 42 on either side of pallet conveyor section 32. Each work platform section 42 is preferably connected to a foldable platform extension 30 along one or more hinges. Each foldable platform 30 serves two purposes. The first is that width profile of the unit 10 is minimized for travel along a commercial road when platforms 30 are in their folded position. The second purpose is to maximize the available space for the laborers working upon unit 10 during harvesting operations. To facilitate the folding procedure, chains 34 can be used to lift the distal ends of platform sections 30 using a winch or the like. Alternatively, one or more laborers standing on the ground surface can push the underside of platform 30 closest to them upward into the folded position.

Pallet conveyor section 32 comprises a stationary elongated central area 36 which has a pair of cooperatively operating displacement chains 38 located on opposing sides of the central area 36 adjacent to the stationary work stations 42.

As best depicted in FIG. 9, chains 38 are elevated above the surface of central area 36 and adjacent sections 42. The pair of displacement chains 38 function as a conveyor belt for pallets and can travel in a forward or reverse direction. The width of pallet conveyor section 32 is designed so that pallets can be placed upon it and be supported by a portion of each of the displacement chains 38 so that no part of any pallet should substantially contact central area 36. Movement of displacement chains 38 are hydraulically controlled from control panel 40. Any pallets placed upon chains 38 can be displaced along pallet conveyor section 32 as desired.

Transport Configuration.

Figure 13:
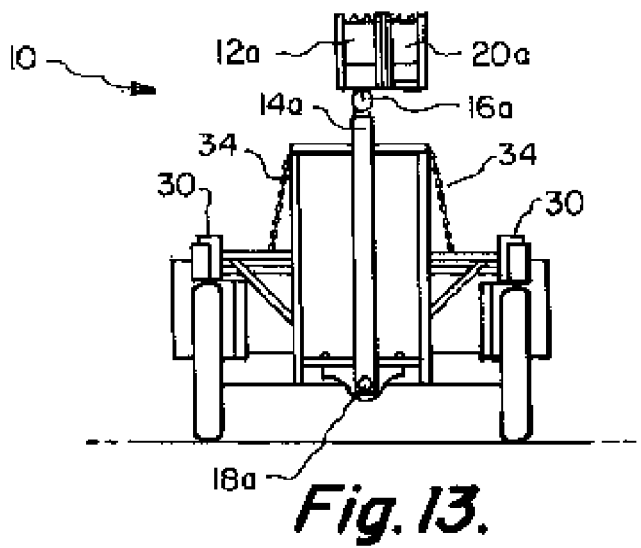
FIG. 13 illustrates a unit in transit with work platforms folded and conveyor belts in a raised position.

FIG. 13 and FIG. 14 illustrate unit 10 in the transport configuration suitable for travel on roadways. Rotating arms 14a and 14b suspend conveyors 12a and 12b. Wing conveyors 20a and 20b can also be suspended by their attachment to conveyors 12a and 12b. However, in an embodiment where wing conveyors 20a and 20b are not hinged to respective conveyors 12a and 12b, each can be disconnected and either placed upon unit 10 or transported separately as will be described later. In the transport configuration, foldable work platform sections 30 are in their folded position.

Harvesting Configuration.

Figure 15:
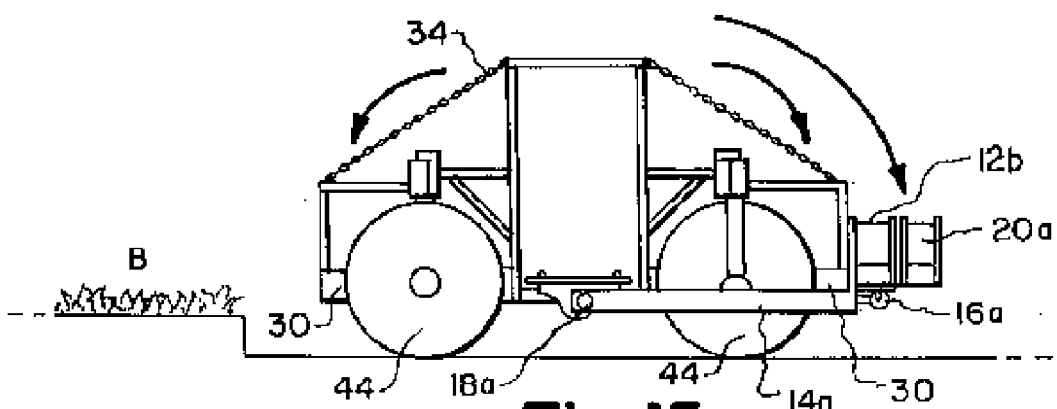
FIG. 15 is the unit depicted in FIG. 13 illustrating the work platform unfolded and the tires rotated for harvesting operation.

Prior to beginning the harvesting operation, unit 10 is positioned for movement across a field B as shown in FIGS. 15 and 16. Foldable platform sections 30 are lowered into a substantially horizontal operating position and the tires 44 are hydraulically orientated for travel across the field B.

Figure 21:
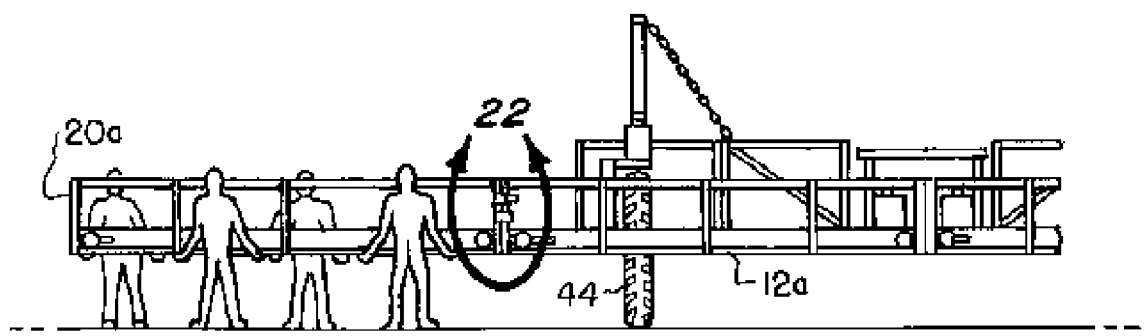
FIG. 21 illustrates the preferred embodiment for extending a wing conveyor.
Figure 22:
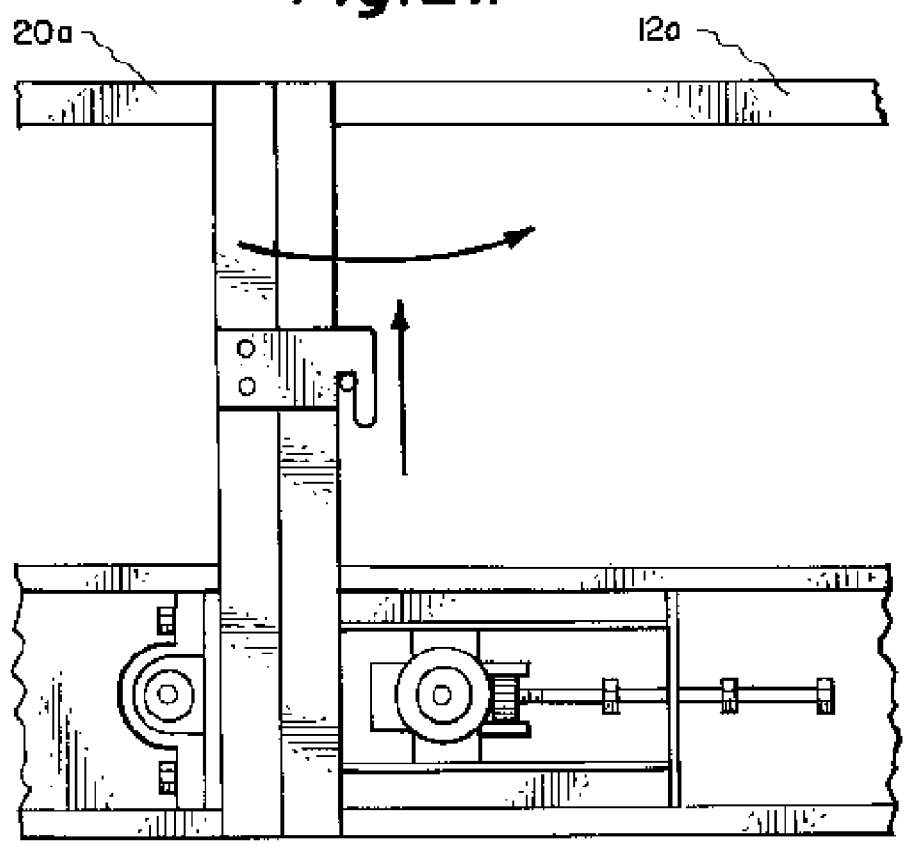
FIG. 22 is a view of 22 of FIG. 21.
Figure 23:
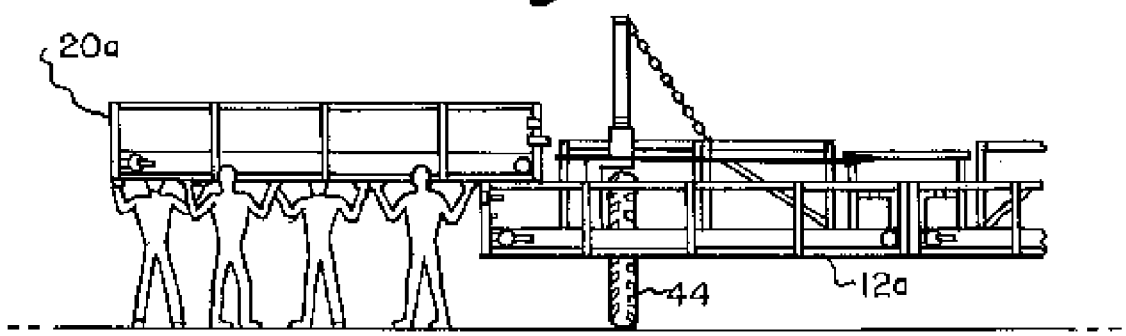
FIG. 23 illustrates disconnecting a wing conveyor and placement upon unit for transport.

In one embodiment, the conveyor/wing-conveyor connection is by hinges 46 best shown in FIG. 16. However, another and more preferred embodiment for this connection is shown by FIGS. 21, 22, and 23. Rather than using a hinge, the connection means comprises a slot and pin arrangement is used where a number of workers will position each wing conveyor 20 above the connection means and then lower until the connection means will support wing conveyor. This connection can be in an "L" or "J" type slot, but any other similar configuration is acceptable.

FIGS. 22 and 23 show the disassembly procedure. Wing conveyor 20a is lifted off the slot and pin connection means and thereafter slid onto central area 36 for transport.

Returning to the description of the harvesting operation, an operator can load pallets and empty flats onto unit 10 by use of a forklift shown as C in FIG. 16. Once wing conveyors 20a and 20b are in their operational position extending away from conveyors 12a and 12b, unit 10 travels across the field as generally depicted in FIG. 1. As the harvesters fill a flat, they place them onto the adjacent conveyor belt which carries the filled flat to a point adjacent to one of the foldable platforms 30. Workers onboard unit 10 then remove the filled flats, and load them onto pallets at area 36. Tables 48 are provided for uses such as inspection of fruit which may be necessary from time to time prior to palletizing the fruit.

Figure 18:
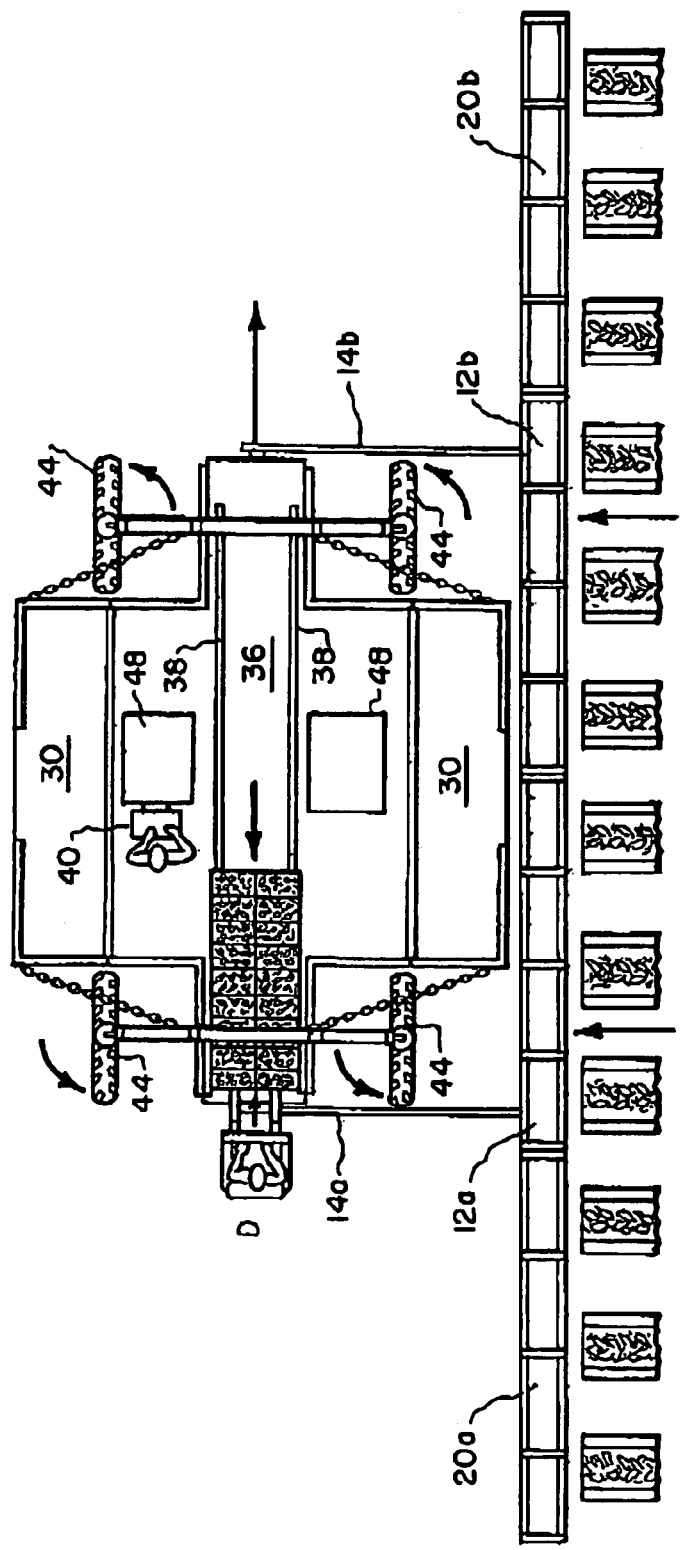
FIG. 18 illustrates the vehicle having completely traveled across a field, rotating tires for traveling along the edge of a field and removal of loaded pallets from the unit by a forklift.
Figure 19:
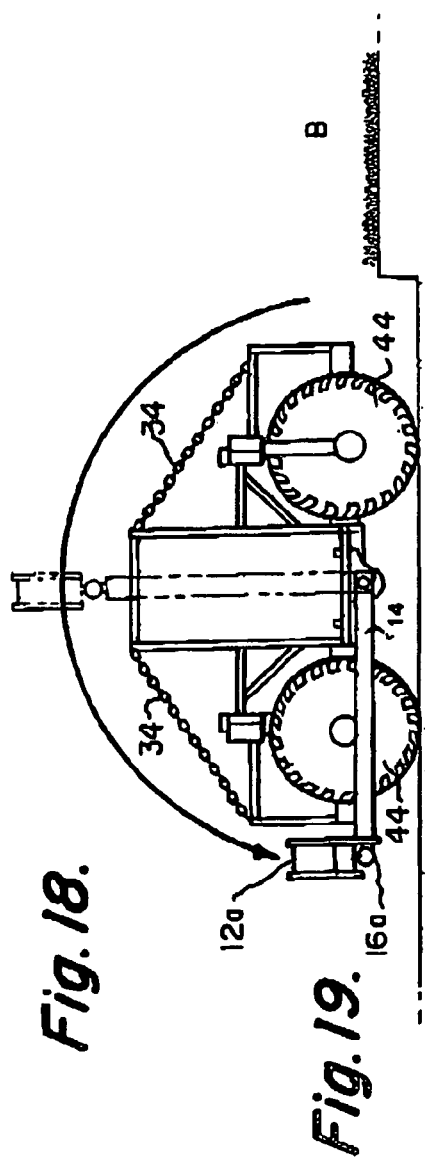
FIG. 19 illustrates the movement of the wing conveyors relative to the main body of the unit.
Figure 20:
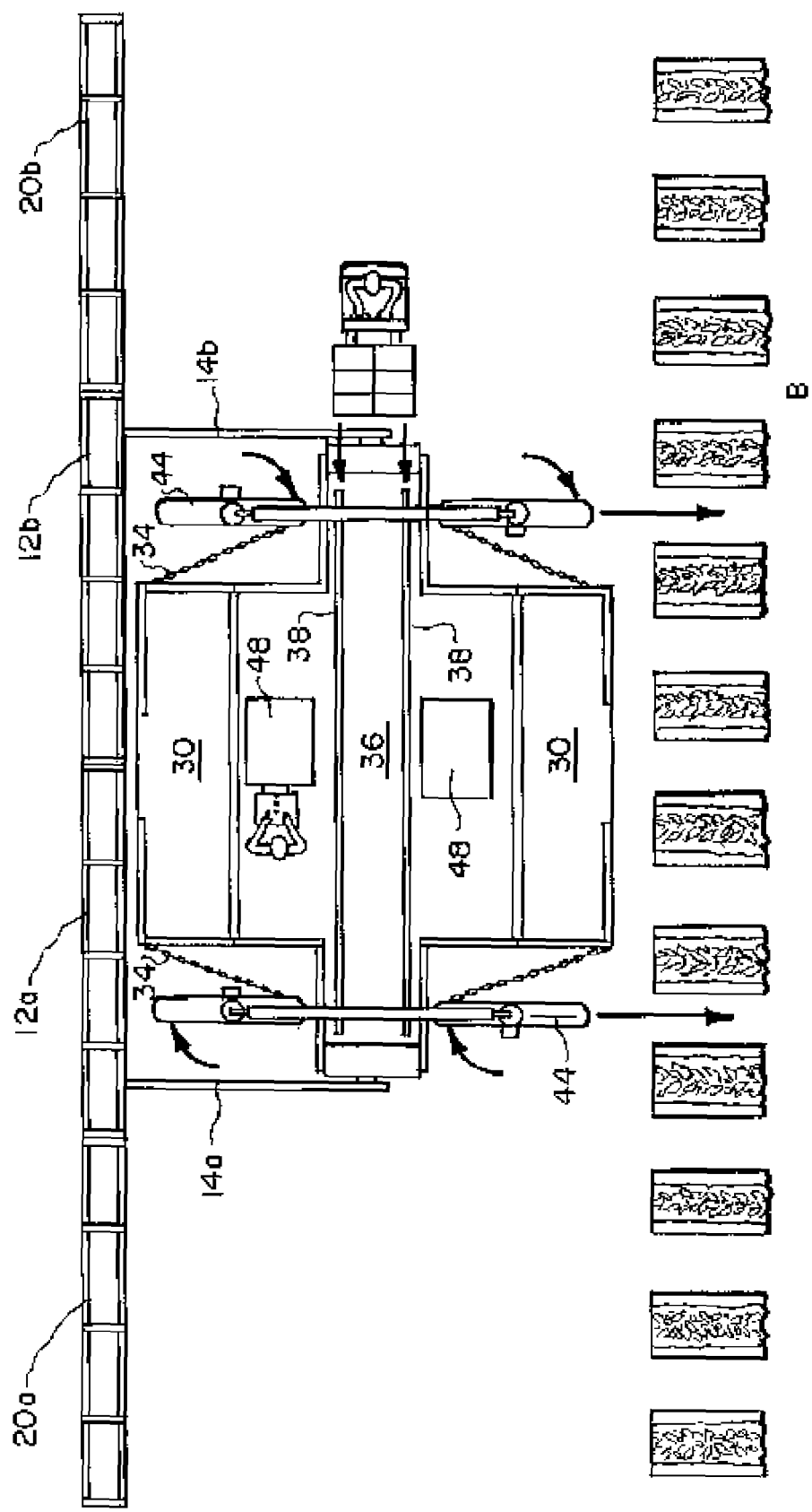
FIG. 20 illustrates the rotation of the tires to align with the field rows for travel across a field.

Once unit 10 has traversed the field, tires 44 are horizontally orientated, typically 90 degrees, for travel along the edge of the field until the conveyor system is substantially aligned with rows of unpicked fruit as shown in FIG. 18. At this juncture, if it becomes desirable to remove palletized fruit, an operator can control the movement of chains 38 from control panel 40 so that the loaded pallets are displaced to the end of unit 10 for removal off the vehicle by forklift D. FIG. 19 illustrates how rotating arms 14 displace the entire conveyor system over the main body of unit 10 until it is on the side of the vehicle opposite the edge of field B. FIG. 20 illustrates the wheels reorientated for traverse back across field B.

FIGS. 17, 24 and 25 illustrate a third embodiment for connecting a wing conveyor 20 to a conveyor 12 using a mast 50 and chain 52 to raise wing conveyor 20 relative to conveyor 12 along hinge 54.

What is claimed is:

1. A method for harvesting fruit from a field comprising the steps of:
   a) providing a plurality of workers;
   b) providing a vehicle with tires adapted for travel across a field, said vehicle having a pair of conveyors in linear relationship to one another and which laterally extend from said vehicle across a plurality of rows, each conveyor comprising a conveyor belt and a trough positioned above said conveyor belt in fixed relation thereto, where both the conveyor belt and trough are sufficiently sized for accepting flats, said vehicle further having a pallet conveyor spanning the width of said vehicle and in parallel relationship to said pair of conveyors;

c) aligning said vehicle so that said pair of conveyors span a plurality of rows from which fruit is to be inspected;

d) displacing said vehicle from one end of the field to the other while workers standing behind said pair of conveyors harvest ripened fruit into flats which when filled, are placed onto one of said conveyor belts which transport the flats to an unloading position;

e) removing said filled flats from said pair of conveyors and palletizing said filled flats on pallets located upon said pallet conveyor;

f) changing the horizontal orientation of said tires for travel along the edge of the field without altering the orientation of the vehicle relative to the field;

g) traveling a distance until the pair of conveyors of said vehicle span different rows of fruit to be inspected;

h) arc displacing said pair of conveyors substantially 180 degrees over the vehicle to the opposite side;

i) changing the horizontal orientation of said tires for travel across the field; and, j) repeating steps d–i as necessary until the field has been traversed.

2. The method of claim 1 wherein said vehicle further comprises a plurality of removable shelves attached to a respective one of said pair of conveyors.

3. A vehicle for traversing across a field for harvesting fruit which comprises a pair of conveyors and a means for operational support and attachment of each conveyor to the vehicle, where each conveyor is positioned to be behind the path of travel of the vehicle across a field, and where each conveyor is of a sufficient length to span a plurality of rows of fruit, the improvement comprising:

where said means for attachment of each conveyor to the vehicle comprises a respective displaceable arm for each conveyor, where each of said displaceable arms is operably connected on one end to said vehicle and on the other end connected to a respective conveyor; and, each of said displaceable arms displacing a respective conveyor in a substantially 180 degree arc over said vehicle.

4. The vehicle of claim 3 further comprising:

a hydraulic leveling device operatively connected to said conveyor for maintaining the vertical orientation of said conveyor as it is displaced by said displaceable arm in a substantially 180 degree arc over said vehicle.

5. The vehicle of claim 3 further comprising a pallet conveyor, a work platform located on either side of said pallet conveyor, and two sets of tires operatively attached to said vehicle to engage the ground surface, one tire set located on one side of said pallet conveyor and the second tire set located on the opposite side of said pallet conveyor, the spacing between each tire of each said tire set being adjustable to adapt said vehicle for operation in fields having different row spacing.

* * * * *